Sept. 23, 1952   H. B. ACKERMAN   2,611,799
ROTARY ELECTROMAGNETIC POSITIONING DEVICE
Filed Dec. 29, 1949
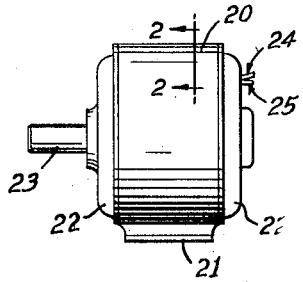
FIG. 1
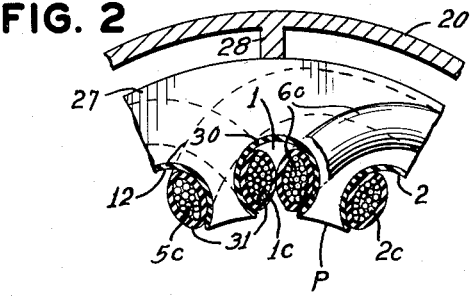
FIG. 2
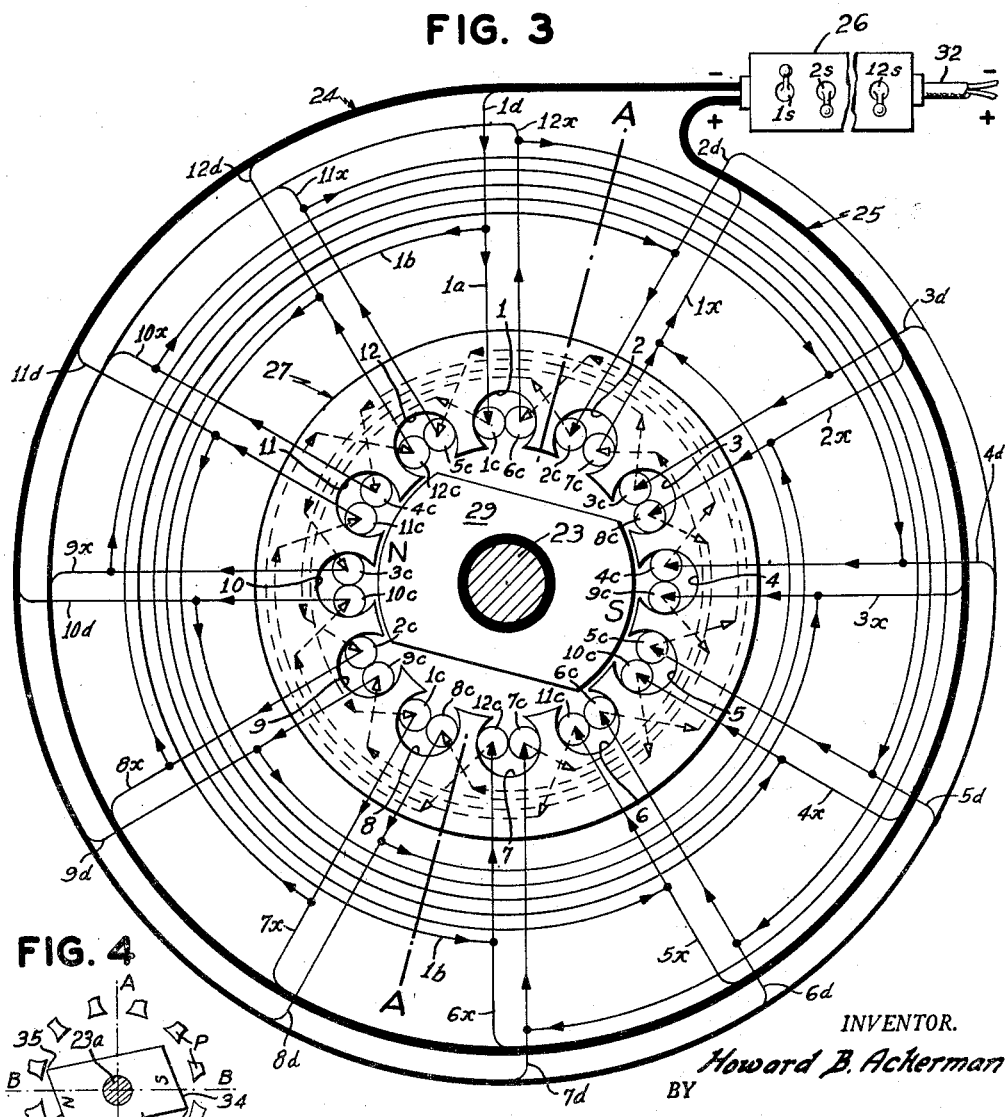
FIG. 3
FIG. 4
INVENTOR.
*Howard B. Ackerman*
BY
*Pennie, Edmonds, Morton and Barrows*
ATTORNEYS Patented Sept. 23, 1952

2,611,799

UNITED STATES PATENT OFFICE 2,611,799

ROTARY ELECTROMAGNETIC POSITIONING DEVICE

Howard B. Ackerman, Rockville Centre, N. Y.

Application December 29, 1949, Serial No. 135,647

14 Claims. (Cl. 172—36)

My invention relates to improvements in rotary electromagnetic positioning devices for accurately positioning various other devices.

I have conceived of the device under consideration as being useful in connection with the turning of the tuning dial of an aircraft radio, particularly for tuning-in any desired station instantaneously. It is to be understood, however, that my improved rotary positioning device may be used for positioning various devices such as hydraulic valves, steam heat controls for railroad cars, switches and other devices and controls for instruments whether located close at hand or at a distance.

The primary object of my invention is to provide a rotary electromagnetic positioning device having a magnetic rotor which may be turned to any selected angular position for which the device is constructed and wherein all the coils of the stator are energized simultaneously for each angular position so selected.

A further object of my invention is to provide a device of the type described in which the magnetic rotor will rotate through the shortest angle to the desired position.

In accordance with the features of my invention, my improved rotary electromagnetic positioning device comprises a magnetic rotor having north and south poles mounted within a stator having a number of distributed coils according to the number of positions, all of which are energized simultaneously in a selected arrangement to rotate the magnetic rotor to any selected position, the coils being arranged with respect to each other and interconnected in such a manner as to create a field of high power for each of the number of positions for which the device is made.

In a preferred construction my rotary electromagnetic positioning device comprises a magnetic rotor having opposed poles at right angles to its axis of rotation, means for selectively producing a magnetic field at a number of positions around the axis of the rotor, said means including a stator ring of magnetizable material surrounding the rotor, a coil carried by said ring for each position for which the device is made, said coils being arranged in series around said ring in regular numerical order, each coil having two substantially spaced sections parallel to the axis of the rotor, corresponding sections of the coils being arranged around the ring in regularly spaced relationship, and current conducting means interconnecting the coils in closed series.

Means is provided for alternatively connecting one of the leads from a current source with each of the means interconnecting adjacent coils. When a current source is connected to a selected pair of said means the rotor will move to a definite position because of the field created in the stator.

In order to insure rotation of the rotor to a position 180° from a previous position I advantageously provide means for creating an eccentric magnetic field in the stator. This result may, however, be obtained by other means as explained hereinafter.

My invention includes other features, objects and advantages which will be described and pointed out hereinafter in connection with the accompanying drawings forming a part of this application and showing an illustrative embodiment of the invention.

In the drawings:

Fig. 1 is an elevational view showing the outer structure of a rotary electromagnetic positioning device according to my invention.

Fig. 2 is an enlarged fragmentary view taken on the line 2—2 of Fig. 1 showing in cross-section the arrangement of the coils in the slots of the stator.

Fig. 3 is an enlarged diagrammatic view partly in section showing the magnetic rotor, the stator, the position of the coils in the stator, and an example of the circuits and connections and current flow for one position of the rotary magnet in an eccentric field.

Fig. 4 is a broken view partly in section showing a modified form of magnetic rotor.

The illustrated embodiment of the rotary electromagnetic positioning device as shown in Fig. 1 of the drawings comprises a cylindrical casing 20 having a mounting base 21 and heads 22 having bearings in which a rotary shaft 23 is mounted, a pair of cables 24 and 25 each including a plurality of current leads extending from the device and connected into a switching mechanism 26, shown in Fig. 3. The mechanism to be operated by the rotary electromagnet is connected to the extended portion of the shaft 23 by any suitable means, such as gearing, arms, switching means and flexible or other shafts suitable for the particular purpose.

The elements of the device mounted in the casing shown in Fig. 1 constitute a stator ring 27 of iron or other magnetizable material held in fixed relation to the casing 20 by peripherally spaced lugs 28 in a known manner as illustrated in the enlarged detail in Fig. 2. The ring 27 is concentric with the shaft 23, which, as shown in Fig. 3, has fixed thereto a permanent symmetrically balanced magnet 29 having north and south poles indicated at N and S.

The stator ring in the particular example shown in Fig. 3 is provided with 12 slots numbered 1 to 12, parallel to each other and parallel to the axis of the ring. These slots, as shown, open through the inner portion of the ring and are wide enough to permit ready insertion of the coils of the stator. The pole ends of the magnetic rotor 29 are curved as shown, and extend closely adjacent to the inner arcuate surfaces of the poles $p$ (Fig. 2) of the stator ring 27 which alternate with the slots. The magnetic rotor 29 may be as thick as the stator ring 27 is wide.

The stator ring 27 carries 12 coils numbered $1c$ to $12c$, each having two sections extending parallel to the axis of the ring. The present stator has been wound eccentrically for the purpose of obtaining an unsymmetrical magnetic field when energized and accordingly the coils in the illustrated embodiment have a full pitch less one stator slot. For example, as regards coil $1c$, the parallel sections are located in stator slots 1 and 8, and for coil $2c$ the parallel sections are located in slots 2 and 9, and so on. In winding the stator symmetrically to obtain a symmetrical magnetic field when energized a full pitch would be employed so that the sections of coil $1c$ would be located in slots 1 and 7, and so on, with the sections for each coil being angularly displaced 180 degrees. In winding coil $1c$ and the other coils, as disclosed in Figure 3, a wire conductor is passed through slots 1 and 8 to form a loop and the winding is continued until coil $1c$ has the desired number of turns. The last turn from slot 8 is then passed through slots 2 and 9 to form coil $2c$ and the winding is continued until this second loop is completed. The remaining coils are formed in a similar manner, all being wound in the same direction, and upon completion of coil $12c$ the last turn leaving slot 7 is connected to the first turn entering slot 1 of coil $1c$. Accordingly, the coils progress in numerical order around the stator and the said coils are connected by the conductors to form a closed series. The slots in which each coil section is mounted is also shown by the following table:

Coil $1c$ in slots 1 and 8
Coil $2c$ in slots 2 and 9
Coil $3c$ in slots 3 and 10
Coil $4c$ in slots 4 and 11
Coil $5c$ in slots 5 and 12
Coil $6c$ in slots 6 and 1
Coil $7c$ in slots 7 and 2
Coil $8c$ in slots 8 and 3
Coil $9c$ in slots 9 and 4
Coil $10c$ in slots 10 and 5
Coil $11c$ in slots 11 and 6
Coil $12c$ in slots 12 and 7

The slots in the ring 27 are lined with insulation 30 and the bundles of windings comprising each coil are covered with a layer of insulation 31. Each coil, as in the case of electromagnets and similar electromagnetic devices, comprises a multiplicity of turns of insulated copper wire as indicated in Fig. 2. The position of the coils in the slots is shown by circles in Fig. 3, it being understood that since each coil is a loop, it will comprise in addition to the sections extending through the slots, respective side portions which lie along the opposite end faces of the ring 27 partly or completely outside the slots. For example, since coil $1c$ has sections mounted in slots 1 and 8, the other portions of the coil will lie opposite each other in an arc along the respective end faces of the ring 27, outside or partially outside of slots 9 to 12.

In Fig. 3 the portions of the coils lying along the under face of the ring 27 are represented by single dotted lines; while the portions of the coils lying on the upper face of the ring 27 lie over the corresponding portions on the opposite or under side of the ring. This relationship is shown in Fig. 2, in which the portions of the coils lying along the underside of the ring are indicated by dotted lines while the corresponding portions lying along the upper side of the ring are in full lines.

The rotary electromagnetic positioning device shown in the illustrative example is a 12-position device, the stator ring having 12 slots and carrying 12 coils arranged so that portions of two different coils are mounted in the same slot in the particular relationship described above. When it is desired to rotate the shaft 23 and magnet 29 to a particular angular position of the twelve positions for which the device is constructed, all coils are energized in a relationship peculiar to that position, the interconnections between the different coils being shown in full lines extending from the circles representing the coils to points outside the ring 27.

The full line connections referred to have been drawn with arrows and connected up to illustrate the circuit connections for moving the rotary magnet 29 to the position shown. The device is connected up with a current source, such as a 24-volt D. C. generator or battery, and current is supplied through a current supply line 32 to the multiple switching mechanism 26 which is provided with a separate double pole switch for each position, respectively numbered $1s$ to $12s$. Each of these switches has a connection to the plus and minus leads of the current supply line 32. The cables 24 and 25 each contain twelve wires respectively connected in pairs to the switches. In the illustrated embodiment each coil has connection with two current leads indicated by $d$ and $x$, respectively. For coil $1c$ the first turn of the conductor entering slot 1 has connection to the inlet lead $1d$. The last turn of the conductor leaving slot 8 has connection to the exit lead $7x$. Likewise for coil $2c$ the first turn connects with inlet lead $2d$ and the last turn with exit lead $8x$ and so on for all the coils.

In the circuit arrangement shown in Fig. 3, the switch $1s$ has been closed and current is supplied from the minus side of the line through the wire $1d$ coming out of the cable 24. Current supplied to this wire is divided through two sets of coils through which it flows in two circuits of unequal lengths, one through a wire $1a$ leading directly to the coil $1c$, while the other leads to the coil $12c$. It will be noted that the branch wire $1b$ leading off to the left from the line $1d$ runs counter-clockwise half-way around the ring 27 to enter the top of the coil $12c$, so that the current flows downwardly therethrough in the slot 7. When a full-line current lead ends in a black arrow, in a circle representing a portion of a coil, the current in that portion of the coil flows downward from the surface of the sheet of drawings; whereas, where a dotted line current lead terminates in an outline arrow in a circle representing a portion of a coil, the current in that portion flows upwardly and leaves the coil through a full line connecting wire.

The portion of the current flowing through the wires 1d and 1a to coil 1c, leaves that coil from the slot 8, as indicated, and flows in series through the succeeding coils 2c to 7c, inclusive. The portion of the current entering coil 12c from the line 1d through branch 1b flows in succession through the coils 12c to 8c, inclusive. The two current paths from the final coils 7c and 8c meet in an exit line 1x which enters the cable 25 and is connected to the switch 1s and to the positive current lead of the line 32. The divided paths of flow through the two sets of coils, 7 in one case and 5 in the other, can be readily traced from one coil to the next by following in the direction of the arrows on the full and dotted lines.

A separate current inlet and outlet line connected to the respective switches 1s to 12s, is shown for each position, the inlet lines being respectively the lines 1d to 12d, inclusive, leading from the cable 24, and the current exit lines being 1x to 12x, inclusive, leading into the cable 25, it being understood that only one pair of these lines is connected at a time and that while the others lead into respective branching lines they do not affect the flow of current from one coil to another through the branching lines. For example, as shown in Fig. 3, the current flowing from the outlet of coil 1c, slot 8, flows toward the outlet line 7x, but since the switch 7s is open the current flows clockwise to the line 2d, and then into the coil 2c.

The current outlet wires for the different positions and numbered 1x to 12x, are respectively connected into the switches 1s to 12s.

In the illustrated example shown in Fig. 3, the magnetic field created in the poles of the stator by the coils in each slot is determined by the direction of current through the portions of the coils in that slot. The full line or black arrows in the circles represent north magnetic fields; while the dotted line or outline arrows represent south magnetic fields. It will be noted, therefore, that coils in slot 1 and 2 create no magnetic field in the intervening pole, since the two coil sections in each cancel or neutralize each other. The coils in slots 3 to 7 create north magnetic fields, or the sum of these create an intensive north magnetic field attracting the south pole of rotary magnet 29. On the other hand, the coil sections in slots 8 to 12 create an intensive south magnetic field in the stator poles attracting the north pole of the rotary magnet 29. The field created by the coil sections in the five north pole slots is equal to the field created by the coil sections in the five south pole slots, but these fields are not divided equally by the north-south line through the axis of the rotary magnet 29. An eccentric field or fields are therefore created, and the instant the switch 1s is actuated, the rotary magnet 29 assumes the position shown, and stops dead in a balanced position at the point of maximum magnetic flux.

Whenever any one of the switches 1s to 12s is closed, as for example switch 1s, as illustrated in Fig. 3, the stator 27 is always divided into two poles, as for example the north and south poles, respectively on the right and left sides of the dot-and-dash line A—A which is at right angles to the north and south axis of the rotary magnet and extends through the null point between the neutralized coil sections in slot 1 and 2.

When the switch 1s is opened and the switch 2s is closed to send current through the lines 2d and 2x, the rotary magnet 29 moves clockwise to the next position. The magnet 29 can be caused to move from one position to any other of the twelve positions, including movement through 180°, independent of all other poles or positions, because of the eccentric character of the field created by the closing of any position switch. In these operations the rotor 29 will rotate through the smallest angle possible from one position to another selected position.

The means or arrangement for creating eccentric or unbalanced fields in the stator is particularly advantageous because it insures the rotation of the rotor through an angle of 180°. Tests have verified these results and have shown that where the field in the stator is symmetrical with respect to a line through the axis and poles of the rotor, the rotor will not always turn when the fields are reversed because of the balanced condition. The eccentric field arrangement therefore avoids the necessity of having to take two or more steps to insure rotation through 180°.

An electromagnetic positioning device may be constructed according to the present invention without including the means or arrangement for forming eccentric fields in the stator, in which the rotor will rotate from one position to a position at 180° therefrom, by providing a magnetic rotor having approximately the structural arrangement shown in Fig. 4 of the drawings. In this view the stator ring 27 and coil arrangements are exactly the same as that shown in Figs. 1 to 3, except that the switch connections are made so that an equal number of coils are traversed in each set by the current supplied to the coils of the stator.

This is accomplished in the illustrative example shown in Fig. 3 by supplying current through the the line 1d and using line 12x as the current outlet, instead of the line 1x. When the connections are made in this way the coils in the slot 1 neutralize each other and the coils in the slot 7 neutralize each other, as will be readily seen by tracing through the paths of current flow from the line 1d to the line 12x. Current flows through the branch 1a and in succession through the set of coils 1c to 6c; while current flowing through branch 1b flows in succession through the set of coils 12c to 7c. The outlet line 12x is connected into the final coils 6c and 7c of the two sets. This change, as will be noted, reverses the current in the coil 7c, thereby changing the arrow in the lower circle 7c to outline, and the one in the upper circle 7c to black.

In Fig. 4 the rotor is mounted on a shaft 23a and comprises a permanent magnet 29a having complementary beveled pole end surfaces 34 which recede from the pole end edges 35 where the magnetic force is the strongest because of the closer proximity of these edges to the poles of the stator. When the rotor magnet is constructed as shown in Fig. 4, the edges 35 which are parallel to and closest to the stator will not line up in the center of the magnetic fields produced in the stator, because of the surfaces 34. While these surfaces 34 recede away from the inner circumference of the stator, they nevertheless have some effect upon the orientation of the rotor so that the center of the fields of the opposite ends of the rotor magnet 29a is approximately on the dot-and-dash line B—B and perpendicular to the dot-and-dash A—A extending through the null points of the stator. This perpendicular line B—B is not parallel to the sides of the rotor magnet 29a but cuts the surfaces 34 at an acute angle inwardly of the edges 35. The surfaces 34 need not be straight but may recede in an arc from the respective edges 35 to gradually increase the spacing from the stator.

If it is desired to rotate the magnet 29a through an angle of 180°, the fields of the stator are exactly reversed. When this occurs in the arrangement shown in Fig. 4, north and south magnetic fields are created respectively opposite the north and south poles of the magnet 29a, and the repelling forces thus applied instantly act upon the sloping surfaces 34 to throw the rotor off balance and thereby initiate its rotation through 180° which is completed by the attractive forces of the stator fields. The initial repelling forces of the stator fields act with greater strength per unit area along the surfaces 34 adjacent to the edges 35 of the rotor magnet and effect the starting of its rotation. As soon as the rotor is off balance, it moves quickly to the reverse position.

Either of the means or arrangements described may be utilized for insuring rotation of the rotor through an angle of 180° in one operation, or other means or changes may be provided for accomplishing this result.

In either form of the device, all the coils of the stator unit are energized for each position and therefore a maximum of electromagnetic energy is provided which in turn develops a maximum torque for the rotation of the magnetic rotor. It has been found that the torque developed by device constructed according to the present invention is equivalent to that of a motor having twice the physical size and the same electrical characteristics.

When it is desired to make a rotary electromagnetic positioning device for any particular number of positions and for a particular purpose, it will be understood that the size of the device will be determined in general by the torque required, and that the number of positions will determine the number of coils and slots of the stator. The illustrated system of connections shown in Fig. 3 and described herein should enable anyone skilled in the art to interconnect the current leads for the two sets of coils so as to achieve the results described.

The positioning device advantageously has an even number of positions or poles so that a distinct null point or points is formed, and the coils may be divided into current paths of unequal length in which one path would include two more coils than the other path. If a device is desired with an odd number of positions, as for example, a 25-position device, it may be made with 26 positions and arranged so that one of the positions is not utilized. In some cases the device may be made with an odd number of positions. However, when it is energized to produce an eccentric field there will only be one pair of coil sections which neutralize each other to provide a null point.

Fig. 3 of the drawings shows separate connections respectively to the cable 24 and to the cable 25 for the different positions. A somewhat simplified form of arrangement can be provided in which the electrical connection between adjacent coils is used at one time for a current inlet connection and at another time in obtaining a different position, for a current outlet connection. Note, for example, that the coil 1c is connected in series with the coil 12c by the connecting wire 1b and that the two ends of the wire 1b are respectively connected to the cable 24 by the lead 1d and to the cable 25 by the lead 6x. The leads 1d and 6x, however, are never used at the same time, and therefore one or either of them could be used to make the connections to the two different current leads at different times for different positions. The circuits and function of the device, however, are more conveniently illustrated in the manner shown in Fig. 3.

While the device of the present invention has been illustrated in connection with a permanent magnet 29 or 29a, it is to be understood that the rotor may comprise an electromagnet. In relatively small devices which have been made, however, it has been found convenient and advantageous to employ a permanent magnet.

What I claim is:

1. In a rotary electromagnetic positioning device including a magnetic rotor having opposed poles at right angles to its axis of rotation, means for selectively producing a magnetic field at a number of positions around the axis of the rotor, said means including a stator ring of magnetizable material surrounding the rotor, a coil carried by said ring for each position for which the device is made, said coils being arranged around said ring in regular numerical order, each coil having two substantially spaced sections parallel to the axis of the rotor, corresponding sections of the coils being arranged around the ring in regularly spaced relationship, and current conducting means interconnecting the coils in closed series.

2. A device as claimed in claim 1 characterized in that the said parallel sections of each coil are respectively mounted adjacent a parallel section of two different coils.

3. A device as claimed in claim 1 characterized in that said coils are wound in the same direction.

4. A device as claimed in claim 1 characterized by including means for connecting selected pairs of said current conducting means with a source of D. C. current for energizing the coils.

5. A rotary electromagnetic positioning device comprising a magnetic rotor having opposed poles at right angles to its axis of rotation, means for selectively producing a magnetic field at a number of positions around the axis of the rotor, said means including a stator ring of magnetizable material surrounding the rotor, a coil having a multiplicity of turns carried by said ring for each position for which the device is made, said coils having overlapping relation and being arranged around said ring in regular numerical order, each coil having two substantially spaced sections parallel to the axis of the rotor, corresponding parallel sections of the different coils being arranged around the ring in regularly spaced relationship, electrical conductors interconnecting the coils in closed series, and a current lead connected into each of the said conductors.

6. A device as claimed in claim 5 characterized by including means for supplying current to one of said current leads whereby current is supplied through the conductor attached thereto in parallel to the adjacent coils connected by the conductor, and a common current outlet connection from other adjacent coils of series.

7. A device as claimed in claim 5 characterized by including means for supplying current to one of said current leads whereby current is distributed in parallel through the conductor to which the lead is attached and to the adjacent coils interconnected by the conductor, and a common current outlet connection from another pair of adjacent coils located at a position in the series of coils dividing it into paths of unequal lengths, whereby an eccentric magnetic field is established in the stator.

8. A rotary electromagnetic positioning device comprising a rotor having opposed poles at right angles to its axis of rotation when magnetized, means for selectively producing a magnetic field at a number of positions around the axis of the rotor, said means including a stator ring surrounding the rotor and having a magnetizable element for each position for which the device is made, a coil for each of said positions, said coils being arranged around said ring in regular numerical order, each coil having two substantially spaced sections parallel to the axis of the rotor, corresponding sections of the coils being arranged around the ring in regularly spaced relationship at said positions, electrical conductors interconnecting the coils in closed series, a current lead having electrical connection to each of said conductors, and means for selecting a pair of substantially separated current leads to energize said coils.

9. A device as claimed in claim 8 characterized in that the current leads are arranged in pairs for dividing the series of coils into two current paths including an unequal number of coils.

10. A device as claimed in claim 8, additionally characterized in that the poles of the rotor have end surfaces at an acute angle to the polar axis of the rotor.

11. In a rotary electromagnetic positioning device, a stator ring, a magnetic rotor providing polar projections and mounted for rotation within the stator, said stator having a plurality of slots parallel to its axis, a coil for each slot comprising a multi-turn loop each wound in the same direction and having two parallel sections disposed in different slots of the stator, said coils being disposed around the stator in regular numerical order and being so arranged that each slot contains a parallel section of two different coils, a conductor electrically connecting the end terminal of each coil with the start terminal of the next adjacent coil in numerical order whereby to connect all the coils in closed series relation, a current lead connected to each conductor, and means connecting a direct current source to a selected pair of current leads for energizing the coils, whereby current is caused to flow in two parallel paths each including its respective coils to produce opposed magnetic fields on respective sides of the stator, and whereby all the coils are energized for each position with certain coils having a parallel section in each magnetic field as a result of the disposition of the sections around the stator and current flow through the same.

12. In a rotary electromagnetic positioning device, a stator ring, a magnetic rotor having polar projections and mounted for rotation within the stator, said stator having a plurality of slots parallel to its axis, an inductive winding for the stator comprising a multiplicity of coils equal in number to the stator slots, said coils being wound in the same direction and each comprising a multi-turn loop having two parallel sections located in different slots angularly spaced approximately 180 degrees, said coils being disposed around the stator in regular numerical order and being so arranged that each slot contains a parallel section of two different coils, a conductor electrically connecting the end terminal of each coil with the start terminal of the next adjacent coil in numerical order whereby to connect all the coils in series, a current lead connected to each conductor, and means connecting a direct current source to a selected pair of current leads for energizing the coils, whereby current is caused to flow in the inductive winding in two parallel paths each including its respective coils to produce opposed magnetic fields on respective sides of the stator, and whereby all the coils are energized for each position with certain coils having a parallel section in each magnetic field as a result of the disposition of the sections around the stator and current flow through the same.

13. A rotary electromagnetic positioning device, a stator having coil receiving slots, a rotor adapted to be selectively positioned at a plurality of locations around the stator, an inductive winding for the stator comprising a plurality of coils disposed around the stator in numerical order and connected in series by conductors each connected to a pair of adjacent coils, said coils each comprising a multi-turn loop having two parallel sections, the parallel sections of each coil being spaced to locate the same in different slots and each stator slot having parallel sections of two different coils, means for establishing opposed magnetic fields in selected positions around the stator to index the rotor comprising switch mechanism for connecting selected pairs of conductors to an energizing current, whereby flow of current in the inductive winding is divided into two parallel paths including a group of coils for each path determined by the current inlet conductor and the particular conductor selected for the current outlet, and whereby all the coils are energized for each position with certain coils having a parallel section in each magnetic field as a result of the disposition of the sections around the stator and current flow through the same.

14. A rotary electromagnetic positioning device as defined by claim 13, further characterized in that the current inlet conductor determines the coil groups and the current outlet conductor determines the number of coils in each group, and wherein for each position a majority of the stator slots contains a parallel section of a coil of one group and a parallel section of a coil of the other group.

HOWARD B. ACKERMAN.

REFERENCES CITED

The following references are of record in the file of this patent:

UNITED STATES PATENTS

| Number | Name | Date |
|---|---|---|
| 1,371,096 | Howe et al. | Mar. 8, 1921 |
| 1,653,946 | Clausen | Dec. 27, 1927 |
| 1,949,145 | De Luca | Feb. 27, 1934 |